United States Patent Office 3,514,414
Patented May 26, 1970

3,514,414
ELECTRICALLY CONDUCTIVE PLATINUM COBALT OXIDES
Robert D. Shannon, Wilmington, Del., assignor to E. I. du Pont de Nemours and Company, Wilmington, Del., a corporation of Delaware
No Drawing. Continuation-in-part of applications Ser. No. 561,336, June 29, 1966, and Ser. No. 612,775, Jan. 31, 1967. This application Aug. 16, 1968, Ser. No. 753,065
Int. Cl. H01b *1/08;* C01g *51/00, 55/00*
U.S. Cl. 252—518                    9 Claims

ABSTRACT OF THE DISCLOSURE

Described and claimed are (1) an electrically conductive platinum cobalt oxide having the formula $Pt_xCo_yO_2$ where $x$ and $y$ are $0.85\pm0.15$ and a crystal structure based on the rhombohedral space group $R\bar{3}m$ and (2) the preparation of the same, e.g., at elevated temperature and pressure from $Co_3O_4$ and $PtO_2$. The compound, which may be modified slightly with manganese, is useful in electrical resistors and the modification and utility also form aspects of the invention.

RELATED APPLICATIONS

This application is a continuation-in-part of my copending applications Ser. Nos. 561,336, filed June 29, 1966, and 612,775, filed Jan. 31, 1967, both now abandoned.

FIELD OF THE INVENTION

This invention relates to, and has as its principal objects provision of, the novel electrically conductive compound platinum cobalt oxide, having the stoichiometric formula $PtCoO_2$ but a strong tendency to be nonstoichiometric, and its preparation at elevated pressure and temperature, e.g., from $Co_3O_4$, metallic Pt and aqueous HCl. The compound, which may be modified slightly with manganese, is useful in electrical applications, and the modification and electrical resistors containing the compound form aspects of the invention.

SUMMARY OF DETAILED DESCRIPTION

The compound of this invention is a platinum cobalt oxide which has a crystal structure based on the rhombohedral space group R3m with cell edge $$a = 6.164 \pm 0.05 \text{A}.$$

and the rhombohedral angle $\alpha = 26°34'$ (based on a hexagonal cell $a = 2.831 \pm 0.05$ A. and $c = 17.83 \pm 0.10$ A.). It also has the elemental composition defined by the formula $Pt_xCo_yO_2$, where $x$ and $y$ are independently $0.85 \pm 0.15$. Within the specified compositional range, the space group does not change, and there is little change in cell edge and rhombohedral angle with change in $x$ and $y$. While the ideal composition of platinum cobalt oxide is $PtCoO_2$, it has a strong tendency to be nonstoichiometric, and cation vacancies may exist at Pt and Co sites leading to the above values of $x$ and $y$ less than 1.0.

Compounds capable of existing in both stoichiometric and nonstoichiometric form are well known, e.g., TiO, and the subject is discussed, for example, by L. Mandelcorn, "Non-Stoichiometric Compounds," Academic Press, New York and London (1964).

Platinum cobalt oxide is a good electrical conductor, exhibiting anisotropic resistivity. The resistivity of the platinum cobalt oxide measured perpendicular to its c-axis is nearly as low as that of copper. This platinum cobalt oxide is also stable to temperatures of the order of 800° C., and is stable under reducing conditions. It is insoluble in nitric acid, hydrochloric acid, and aqua regia.

The platinum cobalt oxide of this invention can be prepared by several methods, three of which will be described herein. The first method is a hydrothermal one which involves reaction of platinum metal with cobalt oxide in pressurized aqueous hydrogen chloride solution. This process can be carried out by placing the cobalt oxide and an aqueous hydrogen chloride solution in a platinum tube which serves as the source of platinum and as the reaction vessel, sealing the tube, and heating it under a pressure of 50–3000 atmospheres at a temperature of 300–900° C. Preferably the reaction is carried out in the presence of an aqueous solution containing 20% hydrogen chloride by weight, said solution occuping approximately 50% of the volume of the reaction tube, under a pressure of 3000 atmospheres and at a temperautre of about 700° C. Reaction times ranging from 6 to 24 hours are satisfactory. In this process the platinm cobalt oxide is obtained in the form of hexagonal metallic-appearing plate-like crystals which can be mechanically separated from any unreacted cobalt oxide.

When manganese dioxide is also included in the reaction mixture in the above hydrothermal process, the resulting platinum cobalt oxide is obtained in the form of rhombohedral metallic-appearing crystals containing 0.1 to 2.0%, by weight, of manganese. The manganese-modified platinum cobalt oxide forms one aspect of the present invention. The space group and electrical properties of the manganese-modified compound are substantially the same as those of the compound containing no manganese although the crystal habit is somewhat different and the stoichiometry is not so precisely known. The formula of the manganese-containing compound is believed to be very close to $Pt_xMn_zCo_yO_2$, where $x$ and $y$ are as before and $z$ is between about 0.004 and 0.11. The manganese may replace part of either the platinum or the cobalt, or part of both, in the crystal lattice. As noted, the manganese-modified platinum cobalt oxide has a crystal structure based on the rhombohedral space group $R\bar{3}m$, like the unmodified material, but with cell edge $a = 6.201 \pm 0.05$ A. and the rhombohedral angle $\alpha = 26°30'$.

A second method of preparing the platinum cobalt oxide involves reaction of $PtO_2$ and $CO_3O_4$ under pressure. The reaction is carried out by heating a mixture of $PtO_2$ and $CO_3O_4$ to 700–950° C. under a pressure of 40–3000 atmospheres in a closed reaction vessel. Preferably, stoichiometric quantities of the platinum oxide and cobalt oxide are used, i.e., 3 moles of platinum oxide to 1 mole of cobalt oxide, and the heating is carried out at about 800° C. under 1000 atmospheres pressure. Reaction times ranging from 6 to 24 hours are satisfactory. In this process the platinum cobalt oxide is obtained as a fine black powder.

In the foregoing methods of preparation, commercially available grades of platinum, platinum oxide ($PtO_2$), and cobalto-cobaltic oxide ($CO_3O_4$) can be used, but grades of highest purity are preferable.

A third method of preparing the electrically conductive platinum cobalt oxide of this invention is described and claimed in the copending application of Donald B. Rogers, Ser. No. 612,774, filed Jan. 31, 1967. This method does not require the use of high pressures and hence can be carried out in less expensive equipment. This procedure is especially useful in preparing platinum cobalt oxide with composition falling between about $Pt_{0.8}Co_{0.8}O_2$ and about $Pt_{0.9}Co_{0.73}O_2$. The method involves reaction of (1) a platinum halide, e.g., $PtCl_2$, with (2) an oxidic reagent containing cobalt such as the cobalt oxides, e.g., CoO and $Co_3O_4$, or an alkali metal or rare earth cobaltate, e.g., LiCoO$_2$ and LaCoO$_3$, at a temperature of 600–850° C. under autogenous pressure in a sealed reaction vessel. Preferably, the reaction is carried out at 700–750° C. with the oxidic reagent being one containing trivalent cobalt. Optionally, the oxidic reagent can be a mixed cobalt oxide or a mixture of cobalt oxides containing divalent and trivalent cobalt. Cobaltous oxide, CoO, is effective in exchanging oxygen for halide ions liberated in the reaction.

This third method of preparation is conveniently carried out by placing a mixture of the reactants in the proportions specified in equations A, B, and C below:

(A)

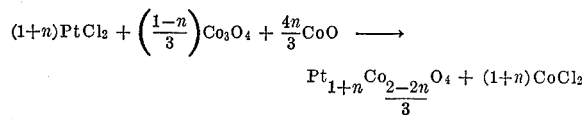

(B)

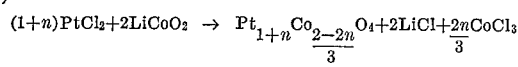

(C)

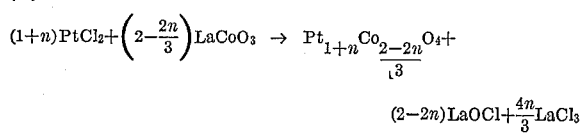

where for highest product purity, $n$ is about 0.6–0.8, in an inert reaction vessel capable of withstanding the reaction conditions to be used, e.g., a platinum tube or a silica tube. The air in the reaction tube is then removed by suitable means. In the case of the platinum reaction tube, the charged tube is crimped along its length to expel air and the ends are then welded shut. In the case of a silica reaction vessel, the charged tube is evacuated to remove air and then sealed shut. The reaction tube is then heated to the desired temperature of 600–850° C., preferably at 700–750° C., by conventional means, e.g., by an electric furnace, for periods ranging from 16–36 hours or more. After heating is completed, the reaction vessel is cooled, opened, and the crystalline reaction product is removed. The product is leached in water to remove CoCl$_2$, or other by-products, and the leached product is then washed with acetone and dried in air.

The platinum halides that can be used in method three include PtF$_2$, PtCl$_2$, PtBr$_2$ and PtI$_2$. The oxidic reagents containing cobalt that can be used in the third method include Co$_3$O$_4$; mixed alkali metal-cobalt oxides (alternatively named alkali metal cobaltates) of the formula MCoO$_2$, where M is an alkali metal, e.g., LiCoO$_2$, NaCoO$_2$ or KCoO$_2$; mixed rare earth-cobalt oxides (alternatively named rare earth cobaltates) of the formula M'CoO$_3$, where M' is a rare earth of atomic number 57–64, inclusive, e.g., LaCoO$_3$, PrCoO$_3$, NdCoO$_3$, SmCoO$_3$, and GdCoO$_3$; and cobaltous oxide, CoO. The commercially available grades of these reagents can be used, but it is preferable to use grades of highest purity.

As implied by the single crystal X-ray analysis described in Example 1, below, platelets of platinum cobalt oxide produced by reaction of Pt, Co$_3$O$_4$, and hydrochloric acid (also by reaction of PtCl$_2$, Co$_3$O$_4$, and CoO) frequently include sizeable single crystals of platinum cobalt oxide ranging in size up to a thickness of about 0.1 mm. with width and length of about 1–1.5 mm. When reaction is effected in the presence of MnO$_2$, the single crystals are usually smaller in size.

EMBODIMENTS OF THE INVENTION

The platinum cobalt oxide and its preparation are described in greater detail in the following examples. In these examples, percentages are by weight, unless otherwise noted.

Example 1

A thin-walled platinum tube 5¼″ long and ⅜″ in diameter, capable of collapsing and responding to changes in internal and external pressure, was charged with 0.6800 g. of BaCO$_3$ (in the event, an unnecessary inert diluent), 3.3188 g. of Co$_3$O$_4$, 1.0 ml. of concentrated hydrochloric acid, and 1.0 ml. of water. The tube was sealed at both end and placed in a pressure vessel capable of withstanding high temperatures and pressures. The tube was then pressured to 3000 atmospheres, heated to 700° C. for 6 hours, and cooled slowly to room temperature. After opening the tube, there was isolated a mixture of fine black powder consisting of unreacted Co$_3$O$_4$ and hexagonal metallic-looking plate-like crystals.

Spectrographic analysis of the plate-like crystals produced showed the presence of platinum and cobalt but no barium. Electron microprobe analysis of the plate-like crystals showed that the atomic ratio of platinum to cobalt was approximately 1:1.2. Further electron microprobe studies showed the crystals to be homogeneous in composition. Single crystal X-ray analysis showed the plates to have the same rhombohedral structure as CuFeO$_2$. The crystals belong to the space group $R\bar{3}m$ with cell edge $a=6.164$ A. and the rhombohedral angle $\alpha=26°34'$ (based on a hexagonal cell $a=2.831$ A., $c=17.83$ A.). The electrical resistivity of the plates was measured on several crystals and found to be very low and strongly anisotropic.

$\rho$ (parallel to crystal plates)=$2$–$4 \times 10^{-6}$ ohm.-cm. at 298° K.

$\rho$ (perpendicular to crystal plates)=$1.3 \times 10^{-3}$ ohm.-cm. at 298° K.

Example 2

A platinum tube of the size described in Example 1 was charged with 2.0 g. of Co$_3$O$_4$, 1.0 ml. of concentrated hydrochloric acid, and 1.0 ml. of water. The tube was sealed, pressured to 3000 atmospheres, and heated at 700° C. for 24 hours. The reaction tube was slowly cooled and the tube opened. There was obtained a black powder consisting of unreacted Co$_3$O$_4$, and interleaved hexagonal metallic-looking plates similar to those in Example 1. X-ray powder patterns obtained on these plates showed them to be the same as those obtained in Example 1. The density of these crystals was found to be 11.496, which agrees well with the calculated X-ray density of 11.37. Differential thermal analysis of the plates showed an endothermic peak beginning at 900–935° C. X-ray analysis of the differential thermal analysis products showed the presence of Pt and Co$_3$O$_4$, indicating that the decomposition of platinum cobalt oxide took place with the formation of platinum, cobaltous oxide and oxgen, and that cobaltous oxide and oxygen reacted on cooling to form Co$_3$O$_4$.

Another sample of platinum cobalt oxide was prepared as described in the first part of this example but with 1.5 g. of Co$_3$O$_4$. A sample of this product gave a chemical analysis of 68.7 percent platinum and 18.6 percent cobalt, which calculates to a composition of Pt$_{0.89}$Co$_{0.80}$O$_2$. This product was found to be insoluble in hydrochloric acid, sulfuric acid, nitric acid, and aqua regia.

Example 3

A platinum tube of the type described in Example 1 was charged with 1.3 g. of Co$_3$O$_4$, 0.7 g. of MnO$_2$, 1.5 ml. of concentrated hydrochloric acid, and 1.5 ml. of water. The tube was sealed and heated as described in Example 2. The product obtained in this way consisted of unreacted Co$_3$O$_4$ and rhombohedral metallic-appearing crystals. X-ray analysis showed the rhombohedral crystals to have the structure of platinum cobalt oxide with hexagonal cell dimensions $a=2.844$ A. and $c=17.940$ A. Emission spectrographic analysis showed the presence of 0.5–2.0% Mn. The presence of manganese in the crystal lattice changed the crystal habit from plate-like to rhombohedral, and increased the cell dimensions slightly.

The crystals had electrical resistivity values similar to those of Examples 1 and 2.

$\rho$(Parallel to c-axis)=$2.0 \times 10^{-3}$ ohm.-cm. at 298° K.

Example 4

A mixture of 0.1353 g. of $Co_3O_4$ and 0.3700 g. of $PtO_2$ was placed in a quartz tube 4″ long and ⅜″ in diameter, and the tube was sealed under vacuum. This tube was heated in an electric furnace at 850° C. for 24 hours. Under these conditions, the pressure inside the tube was approximately 50 atmospheres. After being cooled to room temperature, the tube was opened, and there was obtained a black powder identified by its X-ray powder pattern as platinum cobalt oxide together with a trace of platinum metal and a trace of unidentified material.

Example 5

A mixture of three molar proportions of $PtO_2$ and one molar proportion of $Co_3O_4$ was formed into pellets ¼″ x ¼″ diameter. These pellets were placed in a platinum tube which was then sealed and placed in a pressure vessel capable of withstanding high temperatures and pressures. The platinum tube was heated to 850° C. under a pressure of 1000 atmospheres for 8 hours and then cooled rapidly. After cooling, the platinum tube was opened and the product was found to be a fine powder of platinum cobalt oxide identified by its X-ray powder pattern. There was also a trace of unidentified material. The electrical resistivity of this powder was measured and found to be $\rho = 9.4 \times 10^{-5}$ ohms.-cm. at 298° K.
$\rho = 9.4 \times 10^{-5}$ ohms.-cm. at 4.2° K.

These results show that the material has a low temperature coefficient of resistance (TCR).

Example 6

This example describes the preparation of platinum cobalt oxide by the third, i.e., the low pressure, procedure described earlier. Platinum dichloride (0.4524 g.), $Co_3O_4$ (0.2048 g.), and CoO (0.0637 g.) were mixed by hand with an agate mortar and pestle and placed in a platinum tube 3½″ long and ⅜″ in diameter. These quantities were in the proportions required by the formula

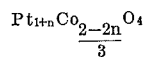

when $n$ is 0.6. The platinum tube was crimped along its length to expel air and sealed by welding. After heating in an electric furnace for 36 hours at 750° C., the tube was cooled and opened. The highly crystalline product was gray in color with a metallic luster and possessed a plate-like habit. After leaching in water to remove $CoCl_2$, the crystallites were washed in acetone and air-dried. The X-ray diffraction pattern of the pulverized product showed the material to have the same rhombohedral structure as $CuFeO_2$. The crystals were found to belong to the space group R3m with cell edge $a=6.164$ A. and the rhombohedral angle $\alpha=26°34'$ (based on a hexagonal cell, $a=2.831$ A., $c=17.83$ A.). Density measurements of the polycrystalline sample indicated a density of about 11.2 g./cc.

Example 7

This example likewise illustrates the preparation of platinum cobalt oxide by the third, i.e., low pressure, procedure described earlier.

A mixture of 1.8092 g. (0.0068 mole) of $PtCl_2$, 0.8188 g. (0.0034 mole) of $Co_3O_4$, and 0.2548 g. (0.0034 mole) of CoO, these being the quantities theoretically required to give $Pt_{0.8}Co_{0.8}O_2$, was placed in a tube of fused silica 12 mm. in diameter and about 5″ long. The tube was evacuated and sealed under vacuum. The sealed tube and its contents were heated over a weekend (approximately 60 hours) at 700° C. in an electric furnace. After heating was completed, the tube was cooled and opened. The resulting reaction product appeared visually to be platinum cobalt oxide.

The product was leached in water to remove $CoCl_2$ and was then found to have an X-ray diffraction pattern identical to that of platinum cobalt oxide. There were indications that a trace of $Co_3O_4$ was present as an impurity. Chemical analysis of the product gave the following results (expressed as weight percent): Pt, 68.47 and 68.39; Co, 16.86 and 16.82; O, 11.85; and Cl, 2.40. Assuming that the Cl was present as unreacted $PtCl_2$, the analytical data correspond to a formula of $Pt_{0.85}Co_{0.785}O_2 \cdot 0.035 PtCl_2$

Example 8

This example likewise illustrates the preparation of platinum cobalt oxide by the low pressure procedure.

A mixture of 0.4523 g. of $PtCl_2$, 0.2047 g. of $Co_3O_4$, and 0.0637 g. of CoO (quantities theoretically required to give $Pt_{0.8}Co_{0.8}O_2$) was placed in a tube of fused silica ⅜″ in diameter and about 4″ long. The tube was evacuated and sealed under vacuum. The sealed tube was heated overnight (about 16 hours) at 700° C. in an electric furnace. After heating was completed, the tube was cooled and opened. The resulting reaction product appeared visually to be the same as that obtained in Examples 1, 2, 6 and 7. After being leached with water, the product gave an X-ray diffraction pattern identical with that of platinum cobalt oxide.

Example 9

The procedure described in Example 8 was repeated with the single exception that a sealed platinum tube was used as the reaction vessel. The product of this experiment possessed the same nominal composition and phase purity as the product of Example 8. The product was combined with that of Example 8 to provide a composite sample of about 3 g. Chemical analysis of the composite product gave the following results (expressed as weight percent): Pt, 66.64; Co, 21.17; O, 12.10, 12.99, and 12.91. The analytical data probably correspond within the limits of experimental error to those calculated for $Pt_{0.8}Co_{0.8}O_2$, but actually correspond to the composition $Pt_{0.86}Co_{0.91}O_2$.

Example 10

Platinum dichloride (0.1695 g.), $Co_3O_4$ (0.950 g.), and CoO (0.0182 g.) were mixed in the indicated proportions to give, in accordance with Equation A, platinum cobalt oxide corresponding to $Pt_{0.7}Co_{0.87}O_2$ in composition. The mixture was reacted as described in Example 6. After leaching in water to remove $CoCl_2$, the product was subjected to X-ray diffraction analysis. The pattern obtained indicated that the product consisted of hexagonal platinum cobalt oxide plus a small amount of $Co_3O_4$.

Example 11

A mixture of 0.1909 g. (0.000718 mole) of $PtCl_2$, 0.0704 g. (0.000292 mole) of $Co_3O_4$, and 0.0319 g. (0.000426 mole) of CoO was reacted under the conditions described in Example 8. The quantities of reactants were those theoretically required, as indicated by Equation A ($n=0.8$) to give $Pt_{0.9}Co_{0.734}O_2$. An X-ray diffraction pattern of the leached product showed that it consisted of hexagonal platinum cobalt oxide with no excess platinum or excess $Co_3O_4$.

The platinum cobalt oxide of this invention is useful in all forms as a component in ceramic electrical resistor compositions. These compositions are especially suitable for applying to, and firing on, ceramic dielectric materials to produce electrical resistors. Such resistor compositions can be prepared by mixing the finely divided platinum cobalt oxide with finely divided vitreous enamel or glass frit. Proportions of oxide to glass frit ranging from 3:1 to 1:1 give good results. The mixture of platinum cobalt oxide and glass frit may, if desired, be mixed with a liquid or paste vehicle, e.g., water, alcohols, esters, liquid resins, and the like, with or without thickeners to provide compositions having a consistency suitable for the particular method to be used in applying the composition to the ceramic dielectric. The finished resistor can be prepared by applying the composition to the ceramic dielectric material by conventional means, e.g., spraying, stenciling, screen printing, or brushing. The ceramic dielectric base material can be composed of any ceramic material that can withstand the firing temperature of the oxide-vitreous enamel composition, e.g., glass, porcelain, barium titanate, aluminum oxide, and the like. After the composition is applied in a uniform thickness, e.g., of the order of 15–25 microns, the composition is dried, if necessary, to remove solvent from the vehicle and then fired in a conventional lehr or furnace at a temperature at which the enamel frit is molten whereby the conductive material is bonded to the ceramic dielectric.

The use of the platinum cobalt oxide of this invention in a specific electrical resistor composition and the application of such composition to a ceramic dielectric base are illustrated in detail below.

Example A

Finely divided (less than 200 mesh) platinum cobalt oxide, prepared as described in Example 5, was mixed with powdered (ball-milled) glass of the following composition: $SiO_2$, 25% (by weight); PbO, 65%; and $B_2O_3$, 10%; and liquid organic medium or vehicle consisting of 90% β-terpineol and 10% of low viscosity ethyl cellulose in the proportions listed in the following table. The compositions were screen-printed on small aluminum oxide plates and the coated plates were then fired under the conditions given in the table to produce electrical resistors. The resistors obtained were mechanically strong and had acceptable resistance, thermal coefficient of resistance (TCR), and drift. They were outstanding in their stability under a reducing atmosphere.

TABLE—ELECTRICAL RESISTORS CONTAINING PLATINUM COBALT OXIDE

| Resistor No. | Solids Oxide | Solids Glass | Solid/liquid ratio | Firing conditions | Resistance (ohms.) |
|---|---|---|---|---|---|
| 1 | 75 | 25 | 3:1 | Belt furnace, 8 min. cycle, 770° C. peak. | 81.6 |
| 2 | 75 | 25 | 4:1 | Belt furnace, 45 min. cycle, 760° C. peak. | 78.4 |
| 3 | 50 | 50 | 3:1 | Belt furnace, 8 min. cycle, 770° C. peak. | 1 12.3K |
| 4 | 50 | 50 | 3:1 | Muffle furnace, 10 min., 760° C. | 1 7.33K |

1 K=1000 ohms.

Note.—Resistor No. 2 exhibited a hot TCR of 182 p.p.m./° C.

When resistor No. 1 was exposed to a reducing atmosphere (85% $H_2$ and 15% $N_2$ by volume) for 4 hours at 100° C., the drift in the resistance was 3.8%. When resistor No. 4 was exposed to the same reducing atmosphere under the same conditions, the drift in resistance was only 0.01%. An ordinary glaze resistor would have changed by a factor of two or more under such conditions.

Since obvious modifications and equivalents in the invention will be evident to those skilled in the chemical arts, I propose to be bound solely by the appended claims.

I claim:

The embodiments of the invention in which an exclusive property or privilege is claimed are defined as follows:

1. An electrically conductive platinum cobalt oxide having a crystal structure based on the rhombohedral space group $\overline{R3}m$ and the formula $Pt_xCo_yO_2$, wherein $x$ and $y$ are independently about $0.85 \pm 0.15$.

2. The compound of claim 1 in the form of hexagonal, plate-like crystals.

3. The compound of claim 1 having cell edge $a = 6.164 \pm 0.05$ and rhombohedral angle $\alpha = 26°34'$.

4. An electrically conductive platinum manganese cobalt oxide having a crystal structure based on the rhombohedral space group $\overline{R3}m$ and the formula $Pt_xMn_zCo_yO_2$, wherein each of $x$ and $y$ is independently about $$0.85 \pm 0.15$$

and $z$ is a value comprised within the range of about 0.004–0.11.

5. The compound of claim 4 in the form of rhombohedral crystals.

6. The compound of claim 5 having cell edge $$a = 6.201 \pm 0.05 \text{ A}$$

and rhombohedral angle $\alpha = 26°30'$.

7. The process of preparing the compound of claim 1 in the form of hexagonal plate-like crystals which comprises reacting, at a temperature in the range 300–900° C. and a pressure in the range 50–3,000 atmospheres, $Co_3O_4$ with metallic platinum in aqueous hydrogen chloride.

8. The process of preparing the compound of claim 1 in the form of a black powder which comprises reacting, at a temperature in the range 700–950° C. and a pressure in the range 40–3,000 atmospheres, $Co_3O_4$ and platinum dioxide.

9. The process of preparing the compound of claim 4 in the form of rhombohedral crystals which comprises reacting, at a temperature in the range 300–900° C. and a pressure in the range 50–3,000 atmospheres, $Co_3O_4$, metallic platinum and manganese dioxide in aqueous hydrogen chloride.

No references cited.

HERBERT T. CARTER, Primary Examiner

U.S. Cl. X.R.

23—50, 315; 117—201, 229; 338—308